United States Patent [19]

Hanon et al.

[11] Patent Number: 5,036,536
[45] Date of Patent: Jul. 30, 1991

[54] ELECTRET MICROPHONE TRANSMITTER FOR USE IN TELEPHONE CIRCUITS

[75] Inventors: David O. Hanon; Ricky R. Walker, both of Ringgold, Ga.

[73] Assignee: Plantronics, Inc., Santa Cruz, Calif.

[21] Appl. No.: 482,157

[22] Filed: Feb. 20, 1990

[51] Int. Cl.$^5$ .............................................. H04M 1/60
[52] U.S. Cl. ...................................... 379/387; 379/395; 381/111
[58] Field of Search ............... 381/111, 112, 113, 114; 379/395, 387

[56] References Cited

U.S. PATENT DOCUMENTS

| | | | |
|---|---|---|---|
| 3,867,576 | 2/1975 | Simonsen | 381/111 |
| 4,233,474 | 11/1980 | Hishinyma et al. | 379/395 |
| 4,378,467 | 3/1983 | Ferrantelli | 381/111 |
| 4,461,929 | 7/1984 | Britt | 379/395 |
| 4,491,697 | 7/1985 | Tanaka et al. | 381/113 |
| 4,629,910 | 12/1986 | Early et al. | 381/113 X |
| 4,649,565 | 3/1987 | Kaizer et al. | 381/111 X |
| 4,757,545 | 7/1988 | Rosander | 381/113 X |

FOREIGN PATENT DOCUMENTS 0010598 1/1982 Japan ................................. 381/113

Primary Examiner—James L. Dwyer
Assistant Examiner—M. Shehata
Attorney, Agent, or Firm—Arnold, White & Durkee

[57] ABSTRACT

A transistor 12 is provided for interfacing an electret microphone 16 to a carbon compatible telephone network by impedance matching. The transmitter 12 includes a rectifier 14 constructed from a plurality of Schottky diodes 44, 46, 48, 50 to reduce voltage drop therein and to provide a stable DC voltage supply to the transmitter 12. An amplifier 18 receives an audio signal from the electret microphone 16, amplifies it, and delivers this amplified signal onto the carbon compatible network via the rectifier 14. The amplifier 18 accomplishes this impedance matching while minimizing voltage drop therein. The amplifier 18 includes a first bipolar transistor 68 having its base connected to the microphone 16 and its emitter connected to the negative terminal of the rectifier 14. A second bipolar transistor 70 is connected as an emitter follower.

11 Claims, 2 Drawing Sheets

ELECTRET MICROPHONE TRANSMITTER FOR USE IN TELEPHONE CIRCUITS

BACKGROUND OF THE INVENTION

1. Field of the Invention

This invention relates generally to transmitters used in telephones systems and, more particularly, to an electric circuit for matching an electret microphone to the electrical characteristics of existing carbon compatible telephone networks.

2. Description of the Related Art

Carbon compatible telephone networks were originally designed for use with telephones employing older technology microphones. That is, microphones with carbon pellets. This type of microphone provides a poor quality of transmission, due primarily to problems associated with the carbon pellets. For example, the pellets often unpack or are packed unevenly. Further, carbon microphones are relatively expensive to manufacture.

More recently, microphone technology has advanced to a more modern state with the development of electret microphones. Electret microphones provide high quality transmission signals at a relatively low cost, with the added benefit of being much smaller in size than the carbon microphones. In other words, electret microphones are particularly well suited for use in the telephone industry.

However, the carbon compatible networks originally designed for use with carbon microphones do not directly interface with telephones employing electret microphones. The carbon compatible networks have a low input impedance, while the electret microphone has a high impedance. Thus, when electret microphones are connected to carbon compatible networks, impedance mismatches occur.

Previously, it has been common practice for handsets employing electret microphones to be interfaced with carbon compatible networks via the use of Darlington pair amplifiers. These Darlington amplifiers are designed to overcome problems arising from mismatched impedances. However, these solutions introduce new problems. The Darlington type amplifiers are designed around bipolar transistors. The emitter of the first transistor is connected to the base of the second transistor, and both collectors are tied together. This connection scheme produces an equivalent transistor with a high gain, which is desirable. Unfortunately, it also results in an equivalent transistor with a base-emitter voltage drop twice that of a normal bipolar transistor. Hence, the demands on bias voltage are undesirably increased.

This last effect is highly undesirable, since the available bias voltage is relatively low. Long transmission lines or additional loads limit the available voltage range even further, and often result in poor transmission quality. For example, in a telephone system that employs multiple extensions, it is common for the transmission quality to degrade substantially when more than one phone is operated on the same circuit. Operating two phones simultaneously outstrips the capacity of the central office to provide voltage to both extensions.

Additionally, a rectifier is commonly used to establish a DC supply voltage for biasing purposes. Both the electret microphone and the amplifier require biasing for stable operation. Presently, standard implementations use silicon rectifiers that exhibit a relatively large voltage drop. As mentioned before, large voltage drops are undesirable in that they degrade the transmission quality and in some instances even limit the use of the handset.

The present invention is directed to overcoming one or more of the problems set forth above.

SUMMARY OF THE INVENTION

In one aspect of the present invention, a transmitter is provided for interfacing an electret microphone with a carbon compatible telephone network. A rectifier receives an electrical signal from the network, rectifies the electrical signal to provide electric voltage to the transmitter via a positive and negative supply terminal, receives an audio signal from the electret microphone, and delivers the audio signal onto the network. An amplifier receives the audio signal from the electret microphone, increases the magnitude of the audio signal, and delivers the amplified audio signal to the rectifier. The amplifier includes impedance matching means for connecting the transmitter to the carbon compatible telephone network.

In another aspect of the present invention a transmitter is provided for interfacing a electret microphone with a carbon compatible telephone network. A rectifier receives an electrical signal from the network, rectifies the electrical signal to provide electric voltage to the transmitter via a positive and negative supply terminal, receives an audio signal from the electret microphone, and delivers the audio signal onto the network. An amplifier receives the audio signal from the electret microphone, increases the magnitude of the audio signal, and delivers the amplified audio signal to the rectifier. The amplifier includes a first transistor having its base connected to the electret microphone and its emitter connected to the negative supply terminal of the rectifier and a second transistor connected to the first transistor as an emitter follower. Further, the impedance matching means includes a transistor connected as an emitter follower.

BRIEF DESCRIPTION OF THE DRAWINGS

Other objects and advantages of the invention will become apparent upon reading the following detailed description and upon reference to the drawings in which.

Figure 1:
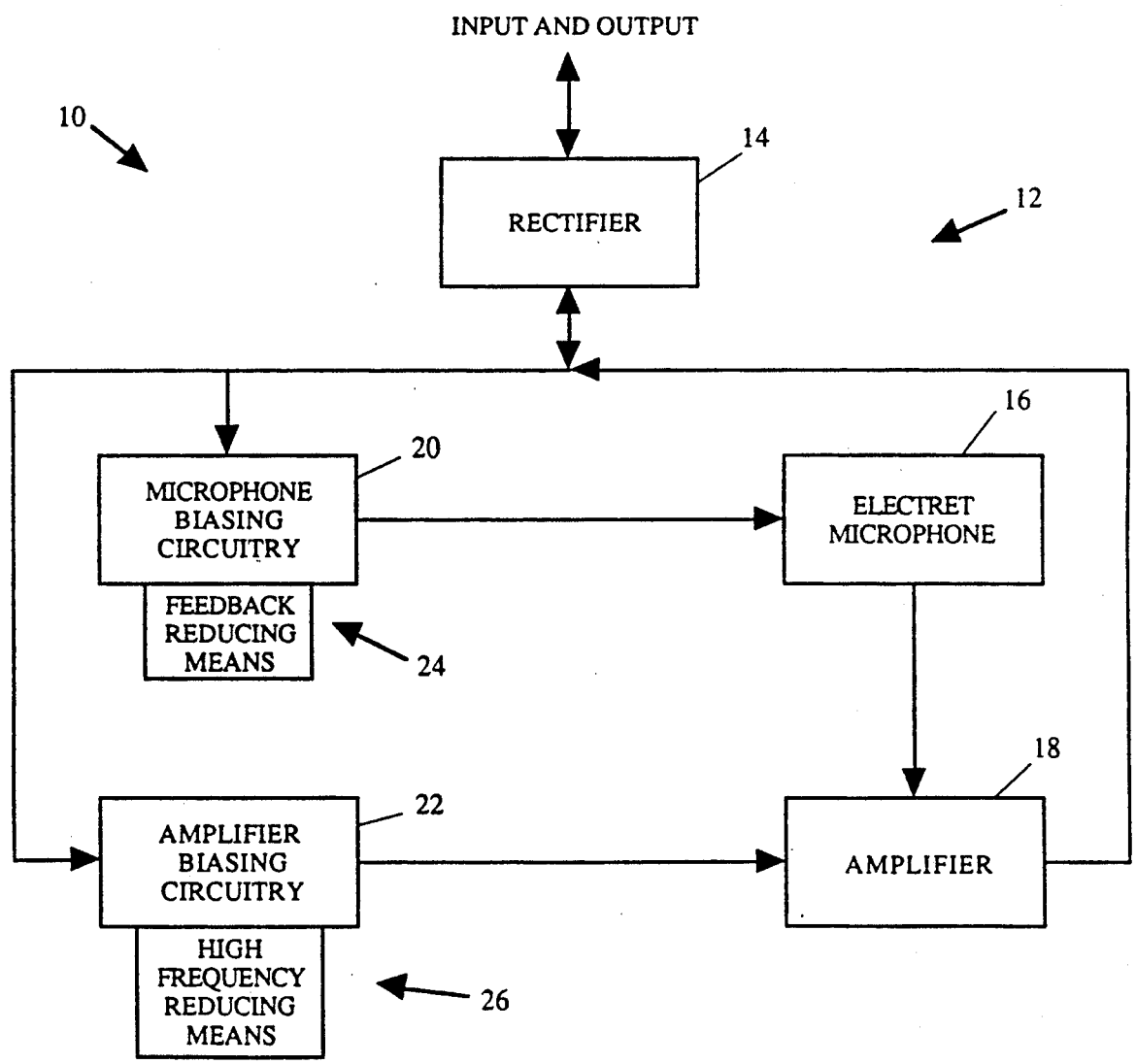
FIG. 1 is a block diagram of the main constituents of the apparatus.

While the invention is susceptible to various modifications and alternative forms, specific embodiments thereof have been shown by way of example in the drawings and will herein be described in detail. It should be understood, however, that the specification is not intended to limit the invention to the particular forms disclosed therein, but on the contrary, the intention is to cover all modifications, equivalents, and alternatives falling within the spirit and scope of the invention as defined by the appended claims.

DESCRIPTION OF THE PREFERRED EMBODIMENT

Turning now to the drawings and referring to FIG. 1, a block diagram of an apparatus 10 is shown. The drawing illustrates the main components that form an impedance matched microphone transmitter 12. A rectifier 14 receives and rectifies an input signal that is used to power an electret microphone 16, an amplifier 18, and their respective bias circuits 20, 22. The rectifier 14 provides for dual polarity operation of the transmitter 12. In other words, the transmitter 12 is connected to a telephone network (not shown) by a pair of leads, wherein the polarity of the two leads is inconsequential to the proper operation of the transmitter 12.

The microphone bias circuit 20 supplies a bias current to the electret type microphone 16. The same bias circuit also includes means 24 for reducing feedback from the amplifier 18 to the electret microphone 16, and to reduce undesirable low frequency signals associated with poor response of the electret microphone 16. The amplifier bias circuit 22 linearizes the output of the amplifier 18, sets the initial amplifier output voltage, and includes means 26 for reducing high frequency interference.

The operation of the transmitter 12 is generally describe hereinafter. The electret microphone 16 receives an acoustic signal from, for example, a person speaking into a handset (not shown), and converts it into an electric signal. The electric signal is transferred to the amplifier 18, which increases the output voltage and current of the electric signal. The amplifier output signal is superimposed onto the supply voltage and is transferred back to the rectifier 14, where it is available for use or processing by auxiliary circuits, such as a carbon compatible telephone network (not shown).

Figure 2:
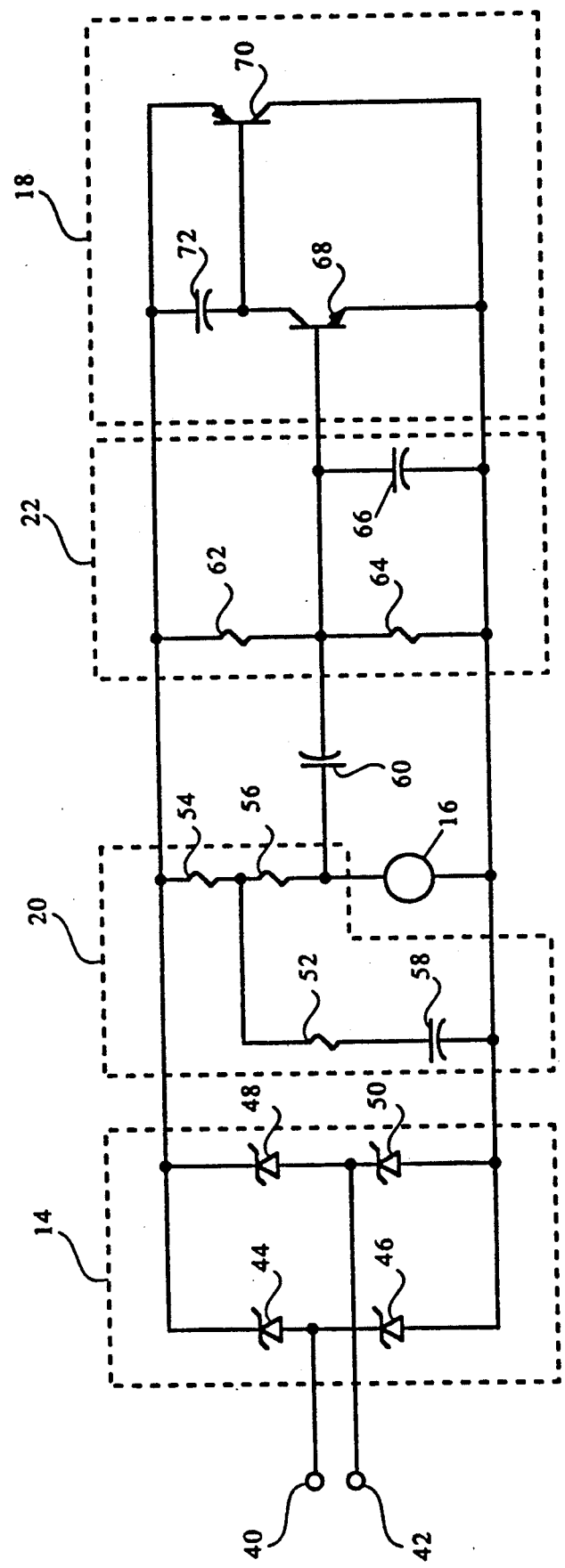
FIG. 2 is an electrical schematic of one embodiment of the apparatus.

A detailed electrical schematic of one embodiment of the transmitter 12 is shown in FIG. 2. A pair of terminals 40, 42 are connected to the rectifier 14, which comprises four Schottky diodes 44, 46, 48, 50. Two of the diodes 44, 46 are connected in series, with their respective anode and cathode connected together and to the first terminal 40. The remaining two diodes 48, 50 are similarly connected in series, with their respective anode and cathode connected together and to the second terminal 42. Additionally, the cathodes of the diodes 44, 48 are connected together and form a terminal for providing the remaining circuitry of the transmitter 12 with a positive DC voltage. Similarly, the anodes of diodes 46, 50 are connected together and form a terminal for providing the remaining circuitry of the transmitter 12 with a negative DC voltage. Under normal operating conditions, the DC voltage differential between the positive and negative terminals is approximately between 2 and 6 Volts.

The Schottky diodes 44-50 advantageously exhibit a relatively low voltage drop when forward biased. Accordingly, the disadvantages associated with the large voltage drop of previous silicon rectifiers is avoided. A typical voltage drop for the rectifier 14 is approximately 0.5 Volts.

The microphone bias circuit 20 provides the electret microphone 16 with a bias voltage. The bias circuit 20 is comprised of two resistors 54, 56. The resistors 54, 56 are connected in series with the electret microphone 16 between the positive and negative supply terminals of the rectifier 14. These resistors 54, 56 provide the electret microphone 16 with a bias current that has a value corresponding to the ohmic values of the resistors 54, 56.

The resistor 52 and a capacitor 58 are connected in series between the junction of resistors 54, 56 and the negative supply terminal. The resistor 52 and capacitor 58 operate as a high pass filter and deliver the high frequency component of the audio signal from the amplifier 18 directly to the negative supply terminal of the rectifier 14. This effectively "shorts" the high frequency component and prevents negative audio feedback from reaching the electret microphone 16. On the other hand, the high-pass filter blocks the lo frequency component of the audio signal generated by the electret microphone 16 and amplified by the amplifier 18. This blocked low-frequency signal is delivered to the electret microphone 16, thereby operating as feedback to control gain of the amplifier 18. Additionally, the capacitor 58 attenuates low frequency signals below approximately 300 Hz. It should be appreciated that the electret microphone 16 has undesirable response characteristics in the 300 Hz and below range.

The electret microphone 16 is connected to the amplifier bias circuit 22 through a capacitor 60. The capacitor 60 passes the audio signal from the microphone 16 and substantially limits DC components therein.

The amplifier bias circuit 22 comprises two resistors 62, 64 and a capacitor 66. The resistors 62, 64 are connected in series between the positive and negative terminals of the rectifier 14. The capacitor 60 is connected between the resistors 62, 64 and through the capacitor 66 to the negative terminal of the rectifier 14. The resistors 62, 64 together provide the amplifier 18 with a bias current, while the resistor 62 alone provides the amplifier 18 with negative feedback. The capacitor 66 attenuates radio interference.

The amplifier 18 comprises two bipolar transistors 68, 70 and a capacitor 72. The capacitor 72 substantially limits radio interference. The transistor 68 is a NPN type and the transistor 70 is a PNP type. The base of the NPN transistor 68 is connected to the junction of the resistors 62, 64, the emitter is connected to the negative rectifier terminal, and the collector is connected to the positive rectifier terminal through the capacitor 72. The PNP transistor 70 has its base connected to the collector of the NPN transistor 68, and its emitter and collector connected to the positive and negative rectifier terminals, respectively. The PNP transistor 70 is connected as an emitter follower.

The combination of the two transistors 68, 70 results in a circuit that has a minimum voltage drop when forward biased (approximately 0.7 Volts). This minimum voltage drop corresponds to the normal voltage drop across a base-emitter junction of a standard forward biased bipolar NPN transistor.

When the NPN transistor 68 is turned "on" the collector voltage is free to "pull down" to its saturation voltage $V_{CE}$, which is only a few millivolts. This low voltage drop across the transistor 68 "pulls down" the base of transistor 70, thereby biasing transistor 70 "on." The emitter-base voltage of the PNP transistor 70 is approximately 0.7 Volts. Hence, the overall minimum voltage drop appearing across the transistors 70, 68 is approximately 0.7 Volts. This low voltage drop minimizes demand on the carbon compatible network to enhance transmission quality.

Additionally, the amplifier 18 has a substantial gain to accommodate any imposed current requirements needed to match the carbon compatible network.

We claim:

1. A transmitter for interfacing an electret microphone to a carbon compatible telephone network, wherein the electret microphone converts acoustic signals to corresponding electrical audio signals, said transmitter comprising:

a rectifier connected to said telephone network via first and second terminals and being adapted for receiving an electrical signal from said network over said first and second terminals and rectifying said electrical signal to provide a bias voltage to said electret microphone an said transmitter via positive and negative supply terminals; and an amplifier connected to the positive and negative supply terminals and being adapted for receiving said audio signals from said electret microphone, amplifying said audio signals, and delivering said amplified audio signals to said telephone network through said rectifier via said positive and negative supply terminals and said first and second terminals, said amplifier comprising:

a first bipolar transistor having its base connected to the electret microphone and its emitter connected to the negative supply terminal of said rectifier; and a second bipolar transistor connected to said first bipolar transistor as an emitter follower.

2. A transmitter, as set forth in claim 1, wherein said second bipolar transistor has its base connected to the collector of said first bipolar transistor, and its emitter and collector are respectively connected to the positive and negative terminals of said rectifier.

3. A transmitter, as set forth in claim 1, wherein said rectifier is a full wave rectifier.

4. A transmitter, as set forth in claim 1, wherein said rectifier includes a plurality of Schottky diodes.

5. A transmitter, as set forth in claim 1, wherein said microphone includes feedback means for limiting amplifier signals and substantially reducing clipping of said amplifier signal.

6. A transmitter, as set forth in claim 5, wherein said feedback means includes a circuit adapted for substantially reducing negative feedback from said amplifier to said microphone.

7. A transmitter, as set forth in claim 6, wherein said circuit includes means for substantially attenuating signals below 300 Hz.

8. A transmitter, as set forth in claim 1, including a capacitor connected between said amplifier and said microphone.

9. A transmitter for interfacing an electret microphone to a carbon compatible telephone network, wherein the electret microphone converts acoustic signals to corresponding electrical audio signals, said transmitter comprising:

a rectifier connected to said telephone network via first and second terminals and being adapted for receiving an electrical signal from said network via said first and second terminals and rectifying said electrical signal to provide a bias voltage to said transmitter via positive and negative supply terminals; and an amplifier connected to the positive and negative supply terminals and being adapted for receiving said audio signal from said electret microphone, amplifying said audio signal, and delivering said amplified audio signal to said carbon compatible network through said rectifier via said positive and negative supply terminals and said first and second terminals, said amplifier including impedance matching means for connecting said transmitter to said carbon compatible telephone network, wherein said impedance matching means includes a transistor connected as an emitter follower, and said impedance matching means is adapted for producing a minimum voltage drop substantially similar to a voltage drop across a single base-emitter region of a standard bipolar transistor that is forward biased in a small signal range.

10. A transmitter, as set forth in claim 9, wherein said amplifier includes:

a first bipolar transistor having its base connected to the electret microphone and its emitter connected to the negative supply terminal of said rectifier; and a second bipolar transistor connected to said first bipolar transistor as an emitter follower.

11. A transmitter, as set forth in claim 10, wherein said second bipolar transistor has its base connected to the collector of said first bipolar transistor, and its emitter and collector are respectively connected to the positive and negative terminals of said rectifier.

* * * * *